(12) United States Patent
Bratkovski et al.

(10) Patent No.: US 8,178,842 B2
(45) Date of Patent: May 15, 2012

(54) NANOWIRE BOLOMETER PHOTODETECTOR

(75) Inventors: Alexandre M. Bratkovski, Mountain View, CA (US); Viatcheslav V. Osipov, East Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/063,430

(22) PCT Filed: Mar. 12, 2009

(86) PCT No.: PCT/US2009/037019
§ 371 (c)(1),
(2), (4) Date: Mar. 10, 2011

(87) PCT Pub. No.: WO2010/047844
PCT Pub. Date: Apr. 29, 2010

(65) Prior Publication Data
US 2011/0168894 A1    Jul. 14, 2011

Related U.S. Application Data

(60) Provisional application No. 61/106,961, filed on Oct. 20, 2008.

(51) Int. Cl.
*G01J 5/00* (2006.01)

(52) U.S. Cl. .................................................. 250/338.1
(58) Field of Classification Search ............... 250/338.1, 250/338.3, 338.4, 339.01
See application file for complete search history.

(56) References Cited

U.S. PATENT DOCUMENTS

| | | | |
|---|---|---|---|
| 5,450,053 | A | 9/1995 | Wood |
| 6,996,147 | B2 | 2/2006 | Majumdar |
| 7,598,482 | B1 | 10/2009 | Verhulst |
| 2006/0210279 | A1 | 9/2006 | Hillis |
| 2007/0131924 | A1 | 6/2007 | Pyun |
| 2007/0158766 | A1 | 7/2007 | Lieber |
| 2008/0081326 | A1 | 4/2008 | Amano |
| 2008/0251723 | A1 | 10/2008 | Ward |

FOREIGN PATENT DOCUMENTS

JP    2007043150    2/2007

OTHER PUBLICATIONS

Rogalski, A., "Infrared Detectors: Status and Trends" (Review), Progress in Quantum Electronics, 2003, pp. 59-210, Elsevier Science Ltd., vol. 27, Warsaw, Poland.

*Primary Examiner* — Mark R Gaworecki (57) ABSTRACT

A photodetector for the detection of radiated electromagnetic energy includes at least one bolometer nanowire disposed at least partially within a photon trap. The at least one nanowire has at least one blackened surface. The blackened surface is configured to absorb radiated electromagnetic energy ranging from far-infrared light to visible light.

15 Claims, 8 Drawing Sheets

NANOWIRE BOLOMETER PHOTODETECTOR

CROSS-REFERENCE TO RELATED APPLICATIONS

The present application claims priority from U.S. Provisional Patent Application Ser. No. 61/106,961, filed on Oct. 20, 2008 in the name of Alexandre M. Bratkovski et al.

BACKGROUND

A bolometer is a device that can detect electromagnetic radiation according to measurable changes in the physical properties of a material that absorbs the radiation. The absorbing material may, for example, experience an increase in temperature when irradiated with electromagnetic energy that affects the resistance of the material. Accordingly, some bolometers measure the resistance of a piece of absorbent material having known dimensions and under controlled conditions to extrapolate a determined amount of electromagnetic radiation being absorbed by the material, and by extension, an amount of electromagnetic radiation present in the vicinity of the absorbent material.

Bolometers are often used in photodetectors for electronic devices configured to measure thermal radiation. For example, certain types of night vision sensors employ bolometer based photodetectors at each pixel to detect infrared light. Bolometers currently available are limited in the available applications, however, due to the fact that they only detect radiation within a narrow band of the wavelengths that represent thermal energy. Moreover, many of the bolometers currently available become less-sensitive at ambient temperatures (e.g., 200-300 K).

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, bolometers can be used in photodetectors of electronic devices. However, the bolometers currently available are limited in that they are only able to detect radiation from relatively narrow bands of wavelengths.

The present specification discloses bolometer-based photodetectors that can detect a wide thermal spectrum of radiated electromagnetic energy ranging from far-infrared to visible light wavelengths. The photodetectors include at least one nanowire disposed at least partially within a photon trap, wherein the at least one nanowire comprises a blackened surface configured to absorb from far-infrared to visible light. The amount of light detected by the photodetector within this band may be determined by measuring a change in resistance in the at least one nanowire.

As used in the present specification and in the appended claims, the term "nanowire" refers to an elongate structure having a radius typically below 50 nm.

As used in the present specification and in the appended claims, the term "photon trap" refers to a structure designed to at least temporarily limit radiated electromagnetic energy directed into the structure to internal reflection within the structure without escaping outside of the structure.

As used in the present specification and in the appended claims, the term "light" refers to radiated electromagnetic energy having a wavelength of between about 20 μm and about 380 nm.

As used in the present specification and in the appended claims, the term "visible light" refers to radiated electromagnetic energy having a wavelength of between about 380 nm and about 760 nm.

As used in the present specification and in the appended claims, the term "far-infrared" refers to radiated electromagnetic energy having a wavelength of between about 8 μm and about 1 mm.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative nanowire bolometers, illustrative photodetectors, and illustrative methods of light detection.

Illustrative Nanowire Bolometers

Figure 1A:
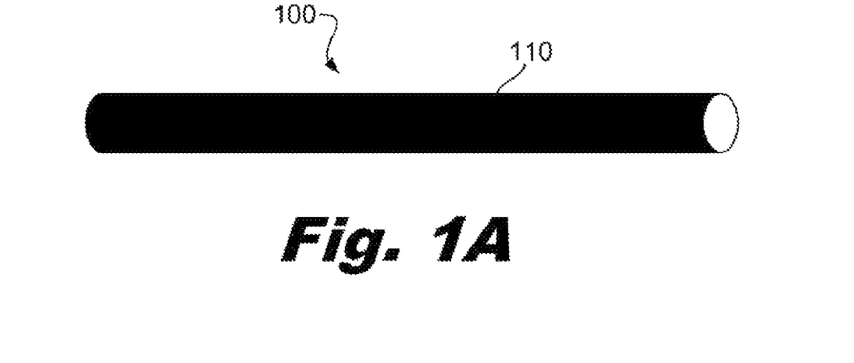
FIGS. 1A, 1B, and 1C are diagrams of illustrative bolometer nanowires for use in photodetector applications, according to various exemplary embodiments of the principles described herein.
Figure 1B:
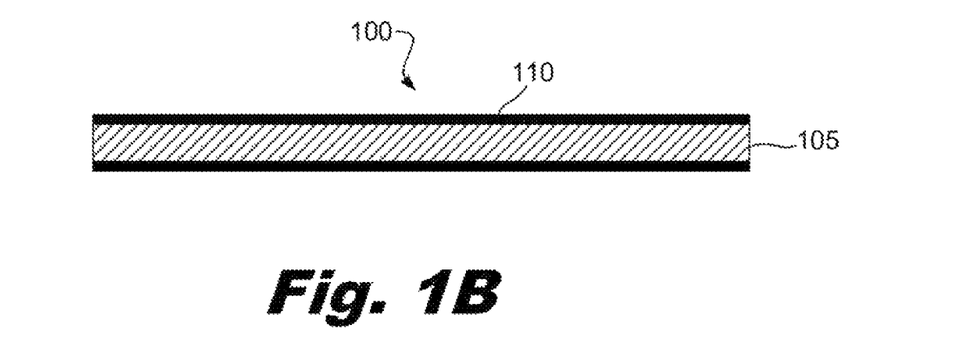
Figure 1C:
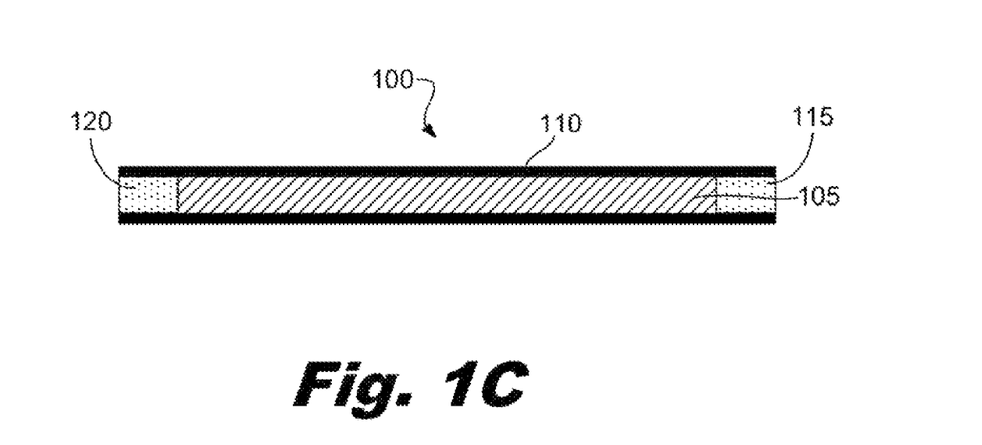

Referring now to FIGS. 1A, 1B, and 1C, illustrative bolometer nanowires (100) are shown (not necessarily to scale). FIG. 1A shows an external perspective view of a bolometer nanowire (100), and FIGS. 1B and 1C are cross-sectional views of different possible embodiments for the nanowire (100) of FIG. 1A.

The nanowire (100) may include a semiconductor core (105) fabricated using any technique that may suit a particular application of the principles described herein. The semiconductor core (105) may include, but is not limited to, at least one semiconductor material such as silicon, germanium, and alloys thereof. A nanowire (100) consistent with the principles of the present specification may have a radius between about 30 µm and about 50 nm.

As shown in FIGS. 1A, 1B, and 1C, the nanowire (100) may include a blackened surface (110). This blackening may be accomplished by coating the exterior of the nanowire (100) with a polymer having at least one dye configured to absorb electromagnetic radiation at wavelengths where the semiconductor material of the nanowire (100) is inherently transparent. For example, one dye that may be included in the polymer is carbon black dye. Additionally or alternatively, multiple dyes or other light absorbing species may be included in the polymer to foment the absorption of electromagnetic energy of as large of a range of wavelengths as possible. In certain embodiments, multiple coats of the polymer may be applied to the core of semiconductor material to achieve a desired blackening effect on the nanowire (100).

As shown in FIG. 1C in certain embodiments the ends (115, 120) of the semiconductor core (105) may be p-doped or n-doped to facilitate electrical communication to respective electrodes. Alternatively, as shown in FIG. 1B the semiconductor core (105) may remain intrinsic along the length of the nanowire (100).

Illustrative Photodetectors

Figure 2:
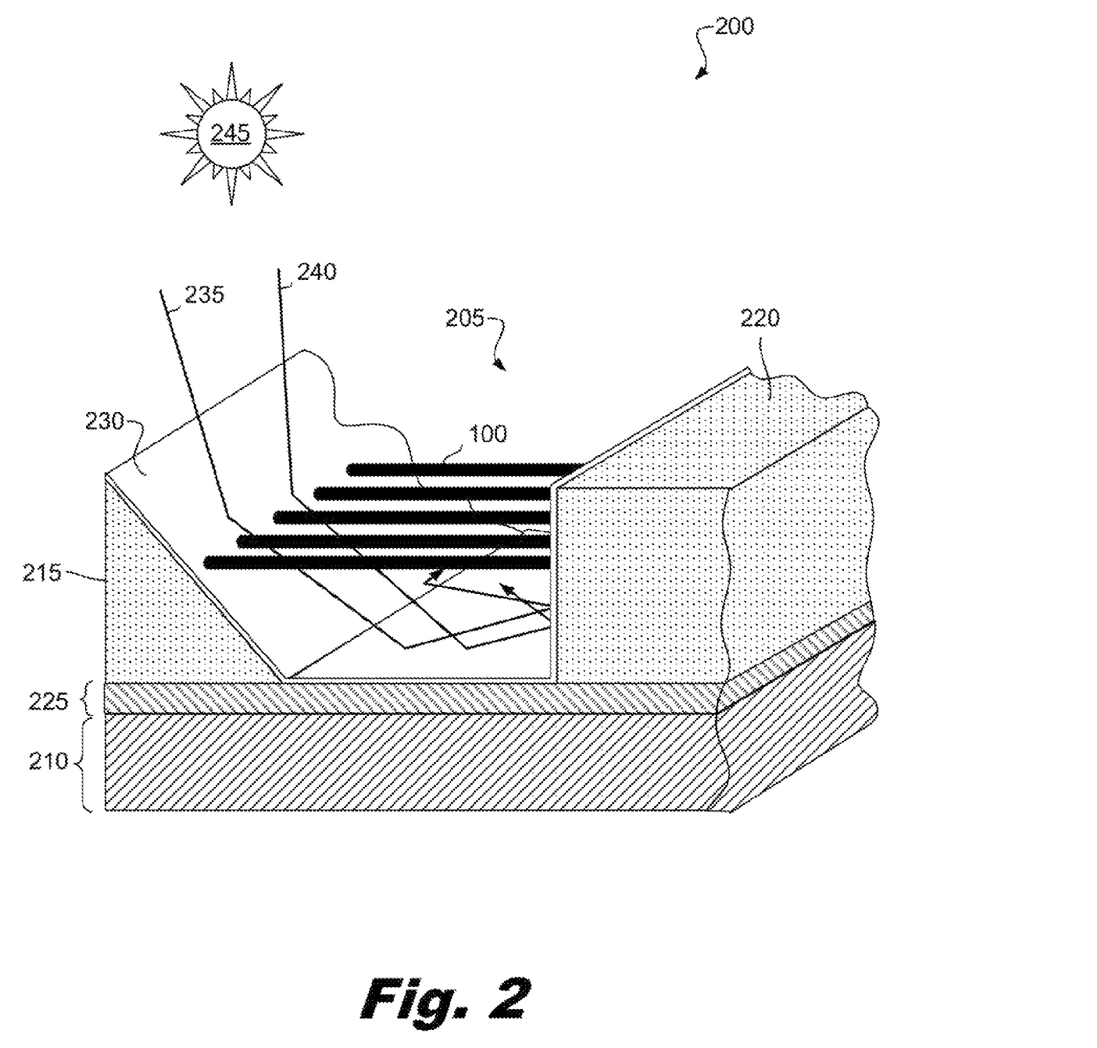
FIG. 2 is a perspective diagram, partly in section of an illustrative nanowire bolometer photodetector according to one exemplary embodiment of the principles described herein.

Referring now to FIG. 2, an illustrative photodetector (200) is shown. The photodetector includes multiple blackened nanowires (100) consistent with those of FIGS. 1A-1C disposed within a photon trap (205). The photon trap (205) may include an open reflective cavity formed on a semiconductor substrate (210). The walls (215, 220) of the photon trap (205) may be formed from doped semiconductor material and be electrically and physically coupled to the nanowires (100), which may extend horizontally from a first wall (215) to a second wall (220). One or more layers of oxide (225) may insulate the first and second walls (215, 220) from each other and from the semiconductor substrate (210).

The inner surfaces of the photon trap (205) may be coated with a reflective layer (230) such as, for example, a layer of silver and/or aluminum. The walls (215, 220) may remain electrically insulated from each other by, for example, a discontinuity in the reflective layer (230) and/or an insulative layer disposed between the electrically conductive doped portions of the walls (215, 220) and the reflective layer (230). Additionally or alternatively, the area in each of the walls (215, 220) around the immediate circumference of each side of the nanowire bolometers (100) where the nanowire bolometers (100) join the walls (215, 220) may be free of the reflective material of the reflective layer (230). In the present example, the inner surface of the first wall (215) of the photon trap (205) is at an angle from the semiconductor substrate (210), thereby forming a slanted mirror. Many different shapes and configurations of reflective surfaces may be used in the photon trap (205) as may best suit a particular application of the principles described herein. The orientation of the reflective surfaces in the photon trap (205) may be configured to at least temporarily limit radiated electromagnetic energy directed into the structure to internal reflection within the structure, and consequently concentrate received light in the vicinity of the nanowires (100). For example, exemplary paths (235, 240) of radiated light from a source (245) are shown in FIG. 2; the paths (235, 240) include multiple bounces within the photon trap (205) before the radiated light exits the photon trap (205).

A brief explanation of the physical properties of a photodetector (200) having bolometer nanowires (100) disposed within a proton trap (205) will now be given with respect to the effects of absorbed electromagnetic radiation.

The amount of radiation power absorbed by one or more nanowires is equal to $\phi_{NW}=\phi_S A/N$, where $\phi_S$ is the density of radiation power (power flux), $A=L^2$ is the area of the photosensitive area (e.g., $L=30$ µm), and N is the number of nanowires. In a photodetector (200) with light concentrators made from a set of silicon or germanium nanowires (100) with blackened surfaces that absorb electromagnetic radiation in the range from far infrared to visible light, the net heat balance equation can be written as:

$$c\rho v_0 \frac{dT}{dt} = -(J_R + J_{air})S_0 - J_{th}s_0 + \frac{A\eta}{N}\Phi_s \quad \text{(Eq. 1)}$$

In Equation 1, c and ρ are the specific heat and the density, respectively, of the semiconductor material in the core of a nanowires (100). T is the average nanowire temperature, $v_0=sL_0$, $s_0=\pi r_0^2$, $S_0=2\pi r_0 L_0$, $r_0$, and $L_0$ are the volume, the cross-sectional area, the surface area, the radius, and the length of a nanowire (100), respectively. η represents the quantum efficiency of absorption. $J_R$, $J_{air}$, $J_{th}$ in Equation 1 represent the heat flows corresponding to radiation cooling, heat diffusion into the ambient air, and outflow through the ends of the nanowire (100). Cylindrical coordinates may be selected with the x-axis along the longitudinal axis of the nanowire (100) and r being the radius vector perpendicular to the longitudinal axis of the nanowire (100). Taking into account the smallness of signal radiation power $\phi_S$, the flows can be expressed as:

$$J_R = 4\sigma T^3 \Delta T, \quad \text{(Eq. 2)}$$
$$J_{air} = \kappa_{air}\frac{dT}{dr}\bigg|_{r=r_0} \simeq \kappa_{air}\frac{\Delta T}{L_{air}},$$
$$J_{th} = \kappa\frac{dT}{dx}\bigg|_{x=0,L_0} \simeq 2\kappa\frac{\Delta T}{L_0},$$

and Eq. 1 can be rewritten in the form $$c\rho\frac{d\Delta T}{dt} = -\left(4\sigma T^3 + \frac{\kappa_{air}}{L_{air}}\right)\frac{2}{r_0}\Delta T - 2\frac{\kappa}{L_0^2}\Delta T + \frac{A\eta}{Nv_0}\Phi_s \quad \text{(Eq. 3)}$$

Here $\sigma=5.67\times10^{-8}$ W/m$^2$K$^4$ the Stefan-Boltzmann constant, κ and $\kappa_{air}$ are thermal conductivities of the semiconductor core of the nanowire (100) and the air, respectively, and $L_{air}$ is the thermodiffusion length in air:

$$L_{air} = \sqrt{\frac{\kappa t}{c_{air}\rho_{air}}}, \quad \text{(Eq. 4)}$$

where $c_{air}$ and $\rho_{air}$ are the specific heat and density of the air, respectively. Estimates show that the bolometer inertia is determined by heat diffusion through the ends of the nanowires (100). Therefore, Eq. 3 can be expressed as:

$$\frac{d\Delta T}{dt} = \frac{1}{\tau}\left(\frac{\eta A L_0^2}{2\kappa v_0 N}\Phi_s - \Delta T\right), \quad \tau \simeq \frac{c\rho L_0^2}{2\kappa}. \quad \text{(Eq. 5)}$$

For a silicon nanowire (100) with the length of 50 μm, $\tau \approx 2 \times 10^{-4}$ seconds. Since a typical refresh rate is 40 Hz, the temperature variation of the bolometer nanowire (100) from Eq. 5 is:

$$\Delta T = \frac{\eta A L_0^2}{2\kappa v_0 N}\Phi_s \quad \text{(Eq. 6)}$$

The resistance of a nanowire (100) having radius $r_0$=30 nm can exceed $10^9 \Omega$/cm. The nanowire (100) of length $L_0$=50 μm has the resistance $R_{NW} \gtrsim 5 \times 10^6 \Omega$. The total resistance is $R=R_{NW}/N$. The typical temperature dependence of nanowire resistance is:

$$R(T) \propto \exp(-\Delta/kT).$$

The voltage variation is given by $$\Delta V = I\frac{dR}{dT}\Delta T = \beta V\frac{\Delta T}{T}, \quad \beta = \frac{1}{R}\frac{dR}{dT} = \frac{\Delta}{kT}. \quad \text{(Eq. 7)}$$

According to Eqs. 6 and 7, the voltage and current sensitivities are equal to:

$$S_V = \frac{\Delta V N}{\Phi_s A} = \frac{\beta \eta L_0^2 V}{2T\kappa v_0}, \quad \text{(Eq. 8)}$$

$$S_I = \frac{\Delta V N}{\Phi_s A R} = \frac{\beta \eta L_0^2 N V}{2T\kappa v_0 R_{NW}}.$$

Using the typical silicon parameters, $$S_v = 2.7 \times 10^4 [V/W], S_I = 0.6 \times N [A/W]. \quad \text{(Eq. 9)}$$

Thus, the current sensitivity $S_1 > 9$ for $N > 15$. In comparison, the current sensitivity of photodiodes and p-i-n diodes is equal to:

$$S_I = e\eta/\hbar\omega. \quad \text{(Eq. 10)}$$

so, for IR detectors in the range of 3-5 μm, $\eta \leq 0.8$, making $S_1 \leq 4$ A/W. Therefore, the present photodetector (200) based on blackened bolometer nanowires (100) with N>16 gives more than a 4-fold increase in $S_1$ over traditional photodiodes and p-i-n diodes.

The detectivity of the bolometer nanowire (100) may be estimated using the mean-square fluctuation of the energy, which according to standard thermodynamics is:

$$\langle \Delta E^2 \rangle = c\rho v_0 kT^2 = (c\rho v_0)^2 \langle \Delta T^2 \rangle, \langle \Delta T^2 \rangle = kT^2/\rho v_0 c, \quad \text{(Eq. 11)}$$

Dispersion of the energy fluctuation is given by:

$$\langle \Delta T^2 \rangle_\omega = \left(\frac{kT^2}{\rho v_0 c}\right)\frac{4\tau}{1+(\tau\omega)^2}, \quad \text{(Eq. 12)}$$

$$\langle \Delta T^2 \rangle_\omega = 4\tau\left(\frac{kT^2}{\rho v_0 c}\right), \text{ for } \omega\tau \ll 1,$$

($\tau = 10^{-4}$ sec and $\omega < 10^3$ Hz). It follows from Eqs. 12 and 7 that $$\langle \Delta V^2 \rangle_\omega = \left(\frac{\beta V}{T}\right)^2 \langle \Delta T^2 \rangle_\omega = \frac{4\tau k}{\rho C v_0}(\beta V)^2. \quad \text{(Eq. 13)}$$

The detectivity (in units of cm $Hz^{1/2}$/W) is determined by $$D^* = \frac{S_v}{\sqrt{\langle \Delta V^2 \rangle_\omega \Delta \omega}}(\Delta \omega L^2)^{1/2} = \quad \text{(Eq. 14)}$$

$$\left(\frac{\eta \times 10^2 L[m]}{2Tr_0}\right)\sqrt{\frac{L_0[m]}{2\pi k \chi}} \left[\frac{\text{cm}}{W}\sqrt{\text{Hz}}\right]$$

One obtains $D^* \approx 10^{11}$ cm $Hz^{1/2}$/W at $L=L_0=3 \times 10^{-5}$ m, $r_0$=30 nm, $\phi$=2[W/m·K], T=200K, $\eta$=0.8. This means that due to light concentration by a photon trap (205), a photodetector (200) based on silicon bolometer nanowires (100) may have detectivity close to the limit for Background Limited Photodetection (BLIP), where $$D^*_{BLIP} = \frac{1}{\hbar\omega}\sqrt{\frac{\eta}{2\Phi_T}} \approx 2 \times 10^{11} \text{ cm}\sqrt{\text{Hz}}/W \text{ for } \lambda < 5\mu. \quad \text{(Eq. 15)}$$

Importantly, a photodetector (200) having bolometer nanowires (100) disposed within a photon trap (205) can absorb thermal radiation at all wavelengths, including the range from 8-12 μm. Accordingly, the present bolometer-based photodetector may be used to detect electromagnetic radiation within the wavelength range of 0.5 μm to 12 μm, which enables BLIP detectivity corresponding to $D^*=(2-3) \times 10^{10}$, even at normal temperatures of T=300K.

Figure 3:
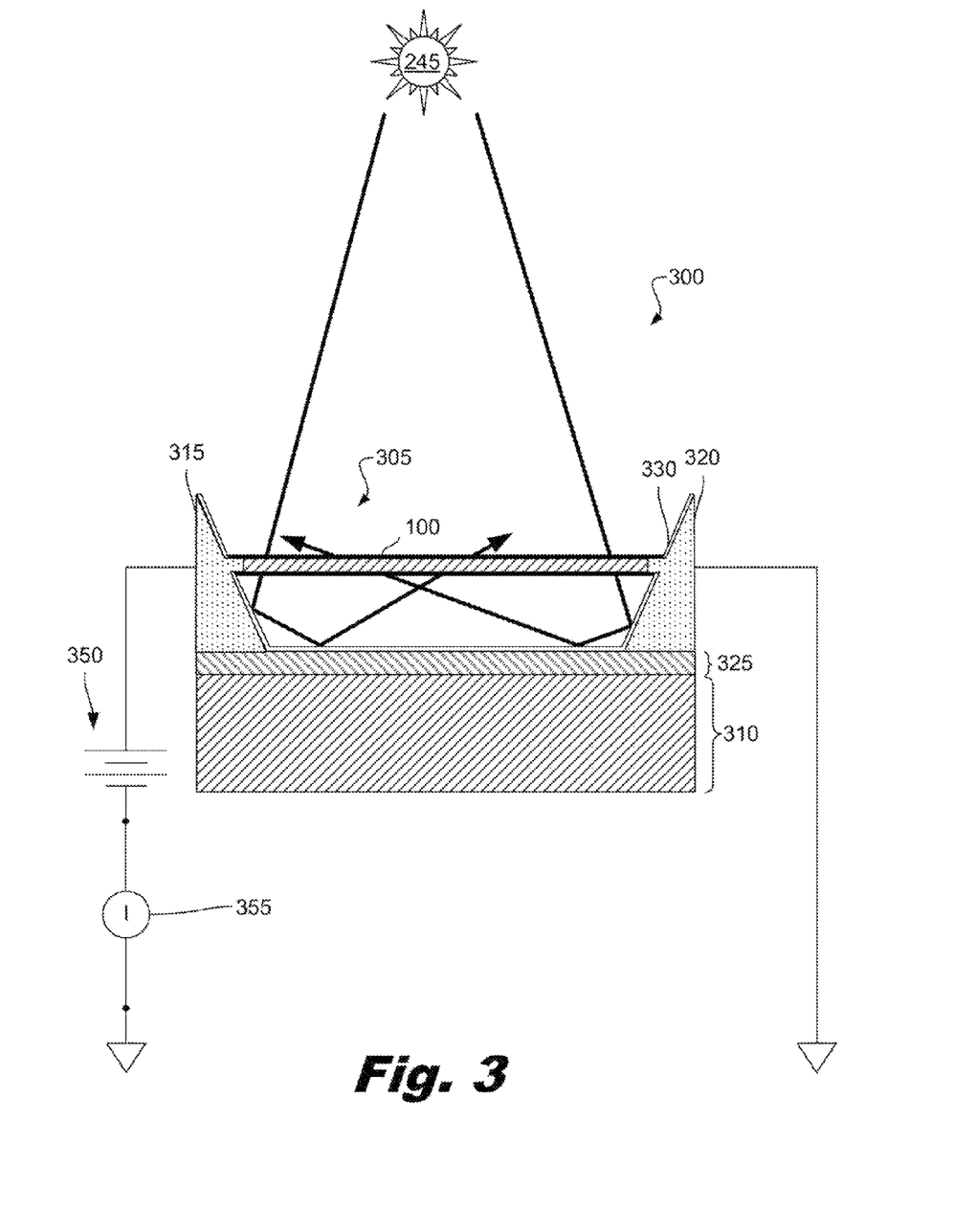
FIG. 3 is a cross-sectional diagram of an illustrative nanowire bolometer photodetector according to one exemplary embodiment of the principles described herein.

Referring now to FIG. 3, cross-sectional side view is shown of another illustrative photodetector (300) that includes a plurality of blackened bolometer nanowires (100) disposed within a photon trap (305) fabricated on a semiconductor substrate (310) and suspended between doped first and second walls (315, 320) of the photon trap (305). Like the photodetector (200, FIG. 2) shown in FIG. 2, the first and second walls (315, 320) of the photon trap (305) are insulated electrically from each other and from the semiconductor substrate (310) by an oxide layer (325). A reflective layer (330) is also disposed over the inner surface of the cavity of the photon trap (305), including the bottom of the cavity and the inner surfaces of the first and second walls (315, 320). The first and second walls (315, 320) may remain electrically insulated from each other by taking any of the measures disclosed above with respect to FIG. 2. Unlike the photodetector (200, FIG. 2) shown in FIG. 2, both shown walls (315, 320) of the photodetector (300) of the present example are angled with respect to the semiconductor substrate (310), thereby forming at least two slanted mirrors.

Electromagnetic radiation may be detected by monitoring the change in resistance of the bolometer nanowires (100). For example, a voltage source (350) may be used to apply a known voltage difference between two terminals connected to either ends of the nanowires (100). In the present example, the doped walls (315, 320) are electrically connected to the nanowires (100) and function as electrodes. Changes in the amount of radiated energy absorbed by the nanowires (100) will cause a change in the resistance of the nanowires (100), which in turn, will cause a change in current flowing between the two terminals as a result of the known voltage difference applied to the terminals. These changes in the electrical characteristics of the current may be measured by a meter (355). In the present example, the meter (355) is a current meter connected in series with the voltage source (350). The measured current flowing through the circuit may then be used to determine the change in resistance of the nanowires (100), and by extension, the amount of radiated electromagnetic energy absorbed by the nanowires (100). Additionally or alternatively, any other meter (355) may be used to measure changes in the properties of the current as may suit a particular application of the principles described herein.

Figure 4:
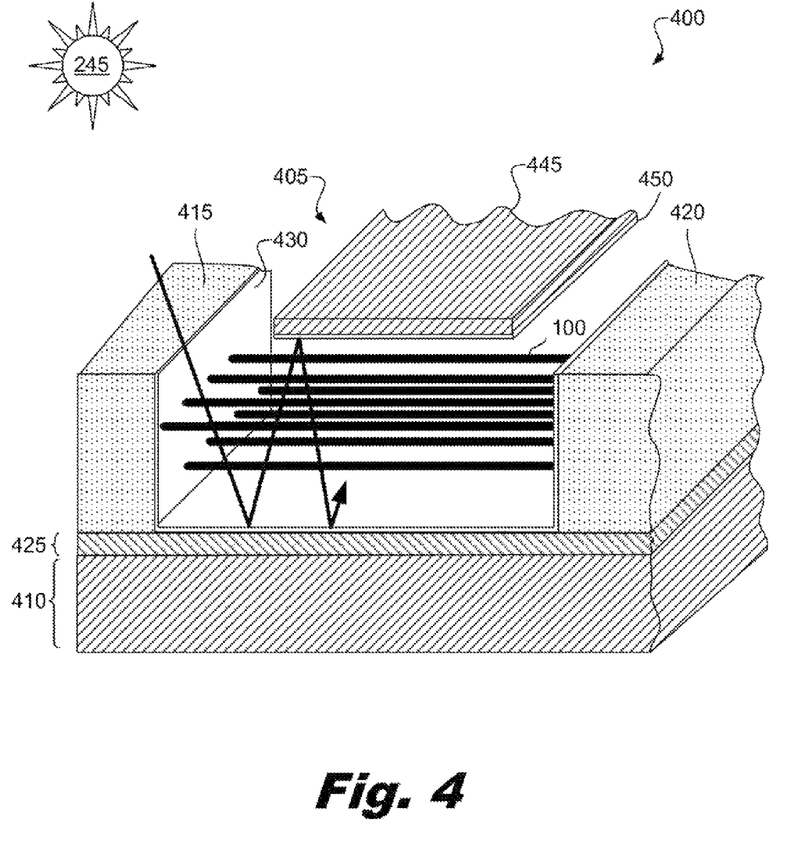
FIG. 4 is a perspective diagram, partly in section of an illustrative nanowire bolometer photodetector according to one exemplary embodiment of the principles described herein.

Referring now to FIG. 4, another illustrative photodetector (400) is shown. Like previous examples, the photodetector (400) includes a plurality of blackened bolometer nanowires (100) disposed within a photon trap (405) fabricated on a semiconductor substrate (410) and suspended between doped first and second walls (415, 420) of the photon trap (405). The first and second walls (415, 420) of the photon trap (405) are insulated electrically from each other and from the semiconductor substrate (410) by an oxide layer (425). A reflective layer (430) is also disposed over the inner surface of the cavity of the photon trap (405), including the bottom of the cavity and the inner surfaces of the first and second walls (415, 420). The first and second walls (415, 420) may be electrically insulated from each other by taking any of the measures described previously with respect to FIG. 2.

The photon trap (405) of the present example includes an open reflective cavity with a top reflector (445) disposed above the cavity of the photon trap (405). At least the underside of the top reflector (445) may include a reflective layer (450) that creates a top mirror configured to reflect radiated electromagnetic energy back into the cavity of the photon trap (405), thereby increasing the number of times that the electromagnetic energy is directed into the vicinity of the bolometer nanowires (100).

Figure 5:
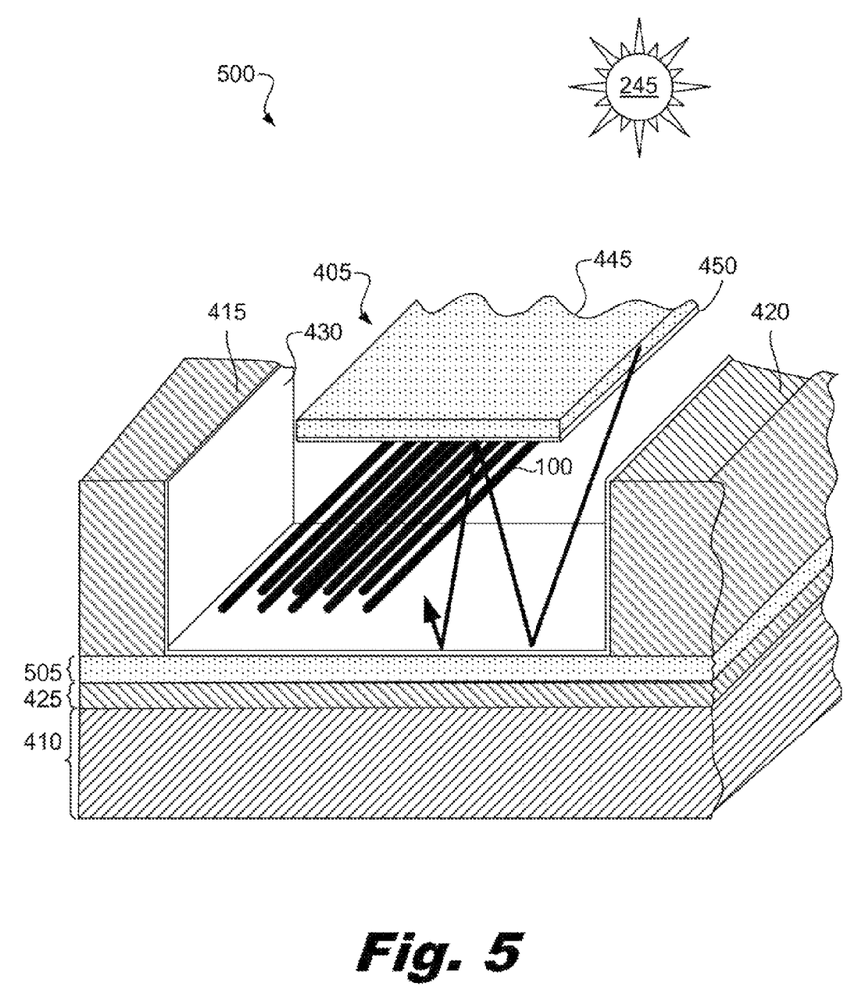
FIG. 5 is a perspective diagram, partly in section of an illustrative nanowire bolometer photodetector according to one exemplary embodiment of the principles described herein.

Referring now to FIG. 5, another illustrative photodetector (500) is shown. The present photodetector (500) is similar to that of FIG. 4, with the exception that the bolometer nanowires (100) of the present example extend up from a bottom electrode (505) to the top reflector (445), which also functions as a second electrode.

Figure 6:
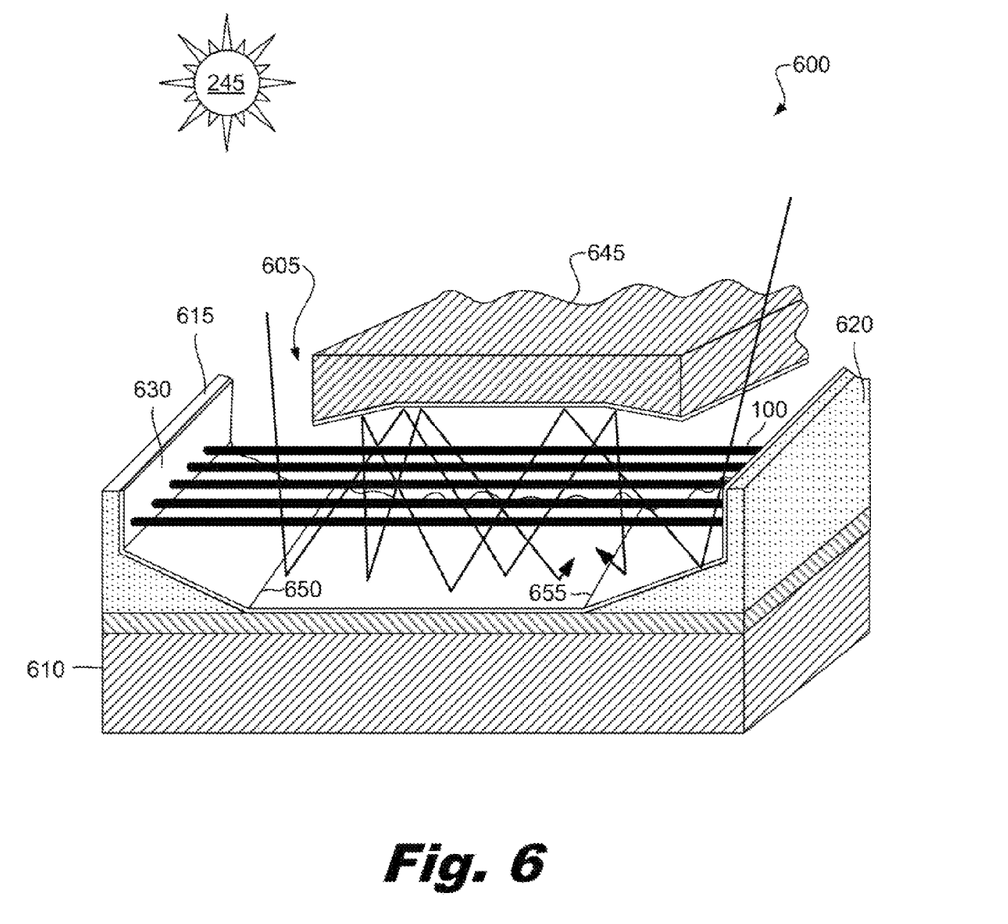
FIG. 6 is a perspective diagram, partly in section of an illustrative nanowire bolometer photodetector according to one exemplary embodiment of the principles described herein.

Referring now to FIG. 6, another illustrative photodetector (600) is shown. Like previous examples, the photodetector (600) includes a plurality of blackened bolometer nanowires (100) disposed within a photon trap (605) fabricated on a semiconductor substrate (610) and suspended between doped first and second walls (615, 620) of the photon trap (605). A reflective layer (630) is disposed over the inner surface of the cavity of the photon trap (605), and a top reflector (645) is disposed above the cavity of the photon trap (605). The first and second walls (415, 420) may be electrically insulated from each other by taking any of the measures described previously with respect to FIG. 2.

Additionally, the reflective inner surface of the photon trap (605) cavity and the reflective surface of the top reflector (645) may include one or more V-grooves (650, 655, 660). The V-grooves (650, 655, 660, 665) may aid in reflecting radiated electromagnetic energy toward the bolometer nanowires (100).

Figure 7:
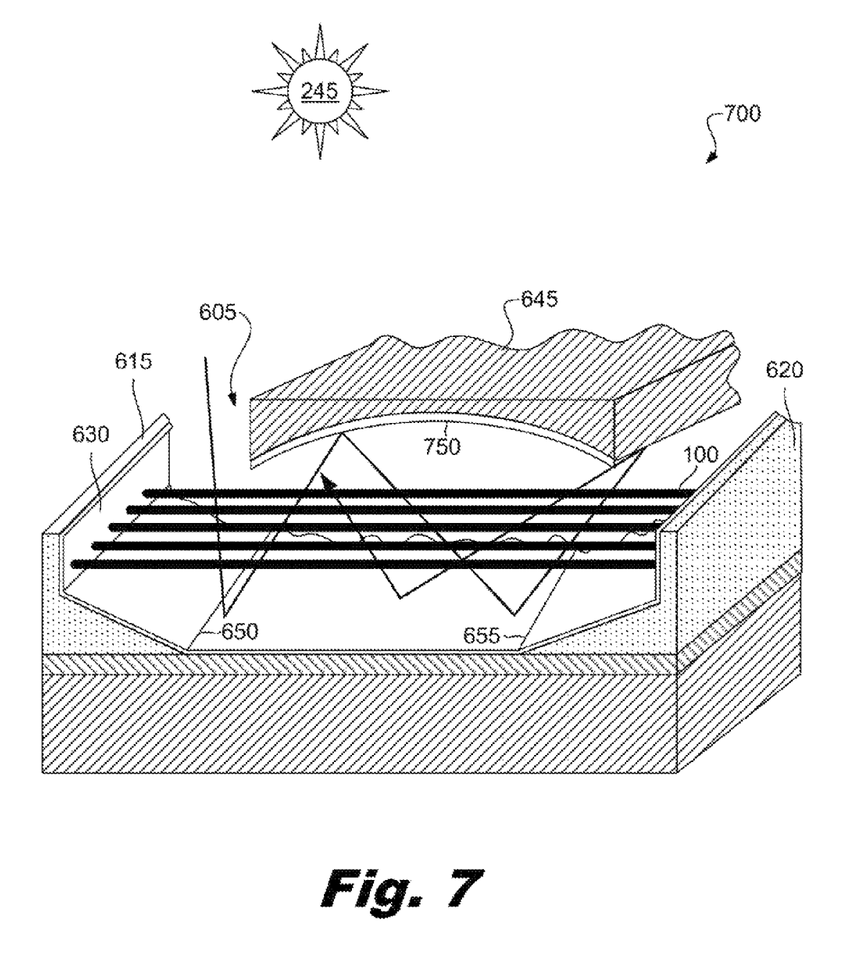
FIG. 7 is a perspective diagram, partly in section of an illustrative nanowire bolometer photodetector according to one exemplary embodiment of the principles described herein.

FIG. 7 shows an illustrative photodetector (700) similar to that of FIG. 6. The reflective surface (750) of the top reflector (645) of the present photodetector (700) is conical in shape.

It should be understood that any variety of geometries, dimensions, and materials may be used in a photon trap consistent with the principles of the present specification. For example, more sophisticated traps that include conical refractors and/or reflectors, varying gratings or grooves within the reflective surfaces, suspended total internal refractors, and the like may be used as may best suit a particular application of the principles described herein.

Illustrative Methods

Figure 8:
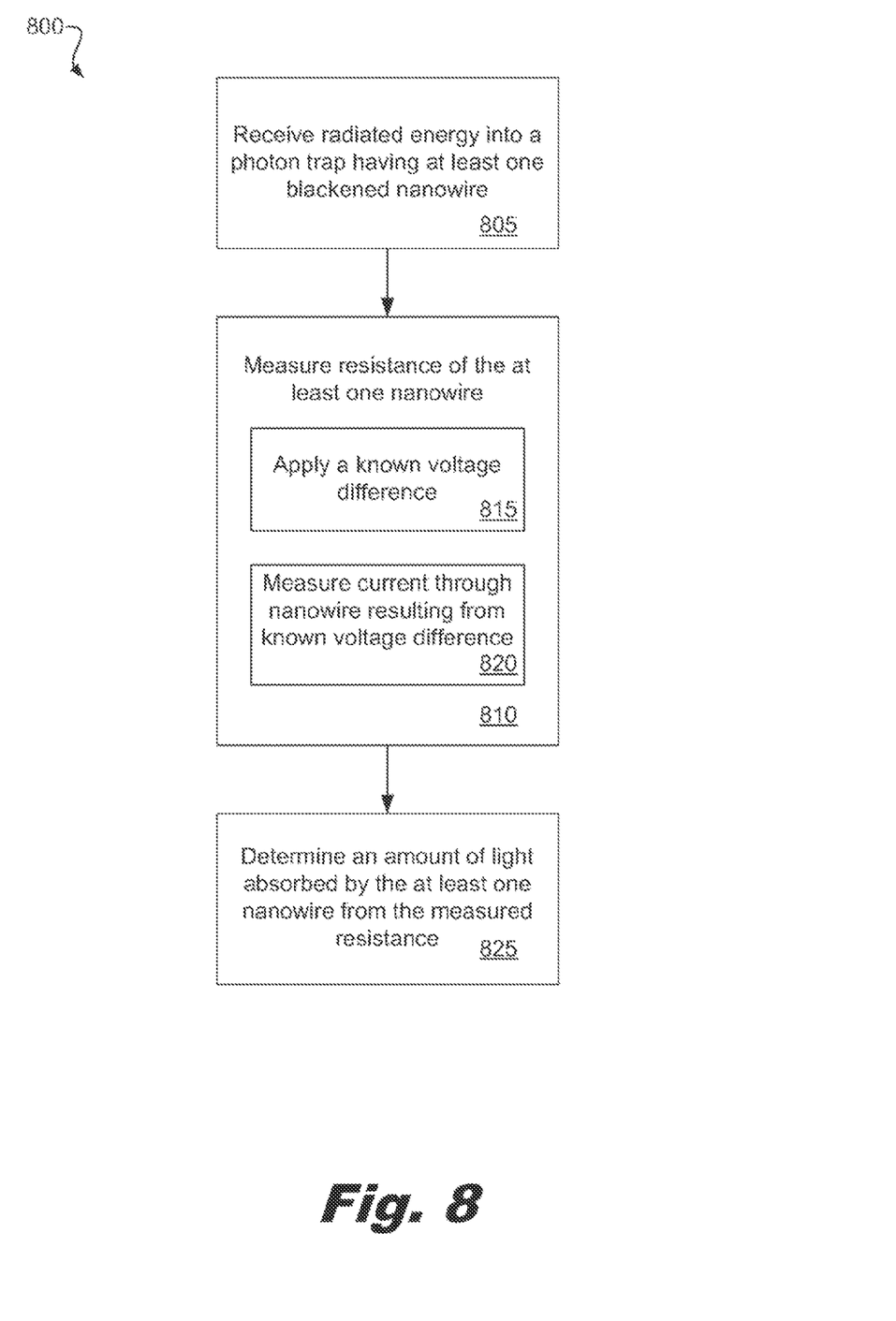
FIG. 8 is a flow diagram of an illustrative method of detecting radiated electromagnetic energy according to one exemplary embodiment of the principles described herein.

Referring now to FIG. 8, a flow diagram is shown of an illustrative method (800) of detecting light. The method (800) may be performed, for example, by one or more electronic devices that include at least one photodetector including one or more blackened nanowires disposed within a photon trap.

The method (800) includes receiving (step 805) radiated energy into a photon trap having at least one blackened nanowire and measuring (step 810) the resistance of the at least one nanowire. The resistance of the at least one nanowire may be measured (step 810), for example, by applying (step 815) a known voltage difference across the at least one nanowire, measuring (step 820) a current flowing through the nanowire resulting from the known voltage difference. The current is linearly related to the resistance of the nanowire.

Once the resistance or the current of the at least one nanowire has been measured (step 810), the relative amount of radiated energy absorbed by the at least one nanowire may be determined (step 825) from the measured resistance and the inherent physical properties of the nanowire.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A photodetector comprising at least one bolometer nanowire disposed at least partially within a photon trap, wherein said nanowire comprises a blackened surface configured to absorb from far-infrared to visible light.

2. The photodetector of claim 1, wherein said nanowire comprises at least one of silicon, germanium, and an alloy of silicon and germanium.

3. The photodetector of claim 1, wherein said photon trap comprises an open reflective cavity.

4. The photodetector of claim 3, wherein said open reflective cavity comprises at least one: a side reflector slanted with respect to said at least one nanowire, a conical reflector, and a reflector having at least one V-groove.

5. The photodetector of claim 3, wherein said photon trap further comprises a reflector disposed above said cavity and configured to reflect light into said cavity.

6. The photodetector of claim 3, wherein said at least one nanowire is horizontally suspended over said reflective cavity.

7. The photodetector of claim 1, wherein said at least one nanowire is electrically coupled to a first electrode disposed at a first end of said at least one nanowire and a second electrode disposed at a second end of said at least one nanowire.

8. The photodetector of claim 1, wherein said blackened surface comprises at least one of a layer of carbon black and a polymer with embedded light absorbing species configured to absorb from far-infrared to visible light.

9. A photodetector, comprising:
  first and second electrodes disposed on opposite sides of a reflective cavity;
  a plurality of nanowires disposed at least partially within said reflective cavity, wherein each said nanowire comprises a first end electrically coupled to said first electrode, a second end electrically coupled to said second electrode, and a blackened surface configured to absorb from far-infrared to visible light;

a voltage source configured to apply a voltage difference between said first and second electrodes; and a meter configured to monitor at least one electrical characteristic of a current flowing between said first and second electrodes and determine an amount of light absorbed by said nanowires from said at least one electrical characteristic.

10. The photodetector of claim 9, wherein said nanowires comprise at least one of silicon, germanium, and an alloy of silicon and germanium.

11. The photodetector of claim 9, wherein said electrical characteristic is a measured magnitude of said current.

12. The photodetector of claim 9, further comprising a top reflector disposed above said reflective cavity.

13. A method of detecting radiated energy, said method comprising:

receiving said radiated energy into a photon trap comprising at least one nanowire disposed at least partially within said photon trap, said nanowire having a blackened surface configured to absorb from far-infrared to visible light;

measuring a resistance of said at least one nanowire, and determining an amount of light absorbed by said at least one nanowire from said measured resistance.

14. The method of claim 13, wherein said photon trap comprises a reflective cavity.

15. The method of claim 13, wherein said photon trap further comprises a top reflector disposed above said reflective cavity and configured to direct radiated electromagnetic energy into said cavity.

* * * * *